(12) United States Patent
Bodin et al.

(10) Patent No.: US 8,427,096 B2
(45) Date of Patent: Apr. 23, 2013

(54) ROTATING ELECTRICAL MACHINE AND METHOD OF CONTROLLING THE SAME

(75) Inventors: Ludovic Bodin, Rosny-sous Bois (FR); Michaël Chemin, Festigny (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 431 days.

(21) Appl. No.: 12/663,402

(22) PCT Filed: May 29, 2008

(86) PCT No.: PCT/FR2008/050944
§ 371 (c)(1),
(2), (4) Date: Mar. 31, 2010

(87) PCT Pub. No.: WO2009/000996
PCT Pub. Date: Dec. 31, 2008

(65) Prior Publication Data
US 2010/0207568 A1    Aug. 19, 2010

(30) Foreign Application Priority Data

Jun. 22, 2007   (FR) ..................................... 07 55979

(51) Int. Cl.
*H02P 1/46*   (2006.01)
(52) U.S. Cl.
USPC ........... 318/717; 318/700; 318/716; 318/718; 318/719; 318/720

(58) Field of Classification Search .................. 318/717, 318/716, 700, 718–720
See application file for complete search history.

(56) References Cited

U.S. PATENT DOCUMENTS

| | | | | |
|---|---|---|---|---|
| 3,787,723 | A * | 1/1974 | Magnuson et al. | 318/823 |
| 5,550,457 | A * | 8/1996 | Kusase et al. | 322/29 |
| 5,587,641 | A * | 12/1996 | Rozman | 318/801 |
| 5,717,298 | A * | 2/1998 | Tang et al. | 318/400.11 |
| 5,739,677 | A * | 4/1998 | Tsutsui et al. | 322/25 |
| 5,754,031 | A | 5/1998 | Kanazawa et al. | |
| 8,179,070 | B2 * | 5/2012 | Lecole et al. | 318/445 |

FOREIGN PATENT DOCUMENTS

| | | |
|---|---|---|
| EP | 1 469 587 A | 10/2004 |
| FR | 2 875 556 A | 3/2006 |
| JP | 55 077381 A | 6/1980 |

* cited by examiner

*Primary Examiner* — Walter Benson
*Assistant Examiner* — David Luo
(74) *Attorney, Agent, or Firm* — Berenato & White, LLC

(57) ABSTRACT

A rotating electrical machine including a first member (10) capable of generating a magnetic field which rotates relative to the first member, and a second member (6) which is provided with a winding through which a current can flow, such that the rotating magnetic field drives the second member in rotation. An electrical value which is at least related to the current is measured (18) and the generation of the rotating magnetic field is started (12) at a time which is determined as a function of the electrical value which is measured. A method of controlling the machine is also disclosed.

6 Claims, 1 Drawing Sheet

ROTATING ELECTRICAL MACHINE AND METHOD OF CONTROLLING THE SAME

FIELD OF THE INVENTION

The present invention relates to a rotating electrical machine and to a method of controlling the same.

BACKGROUND OF THE INVENTION

Rotating electrical machines are formed by a rotor and a stator, one of these members generating a rotating electrical field in such a way as to drive the other member in rotation.

In practice, the stator is generally formed by a plurality of phase windings which are distributed around its periphery and which are supplied in succession in such a way as to create the rotating magnetic field.

In this context, the rotor carries a winding through which a current of an intensity greater than a given value has to flow if the winding is to be sufficiently magnetised to be driven by the rotating magnetic field.

Because of this, the general procedure, before the rotating magnetic field is generated by the stator, is to perform a pre-magnetisation step in which a voltage is applied to the terminals of the rotor winding, which gives rise to an increasing current in the latter.

Patent application FR 2 875 556 for example describes a solution for anticipating, as much as is possible, the need for the electrical machine to be started and consequently the need for a pre-magnetisation step to be carried out. In this document, the starting of the electrical machine by the exciting of the stator is carried out with a predetermined delay (150 ms in the example given) relative to the beginning of the pre-magnetisation.

This delay time is calculated to ensure that the rotor is adequately magnetised in the different electrical conditions to which the system may be subject and the pre-magnetisation time is thus not optimum, especially in systems where use is made of a store of energy which results in a voltage liable to vary in quite wide proportions, but also because of the uncertainty which there is about electrical values in any type of system.

SUMMARY OF THE INVENTION

To meet this problem, and hence in particular to optimise the energy consumed for the pre-magnetisation of the rotor, the invention proposes a rotating electrical machine which comprises a first member capable of generating a magnetic field which rotates relative to the said first member, and a second member which is provided with a winding through which a current can flow, such that the rotating magnetic field drives the second member in rotation, which rotating electrical machine is characterised by means of measuring an electrical value which is at least related to the said current and means of initiating the generation of the rotating magnetic field at a time which is determined as a function of the electrical value which is measured.

In a first embodiment, the said electrical value is the said current. The means of initiating the generation of the rotating magnetic field are for example capable in this case of initiating the said generation when the current measured reaches a threshold value, which enables a pre-magnetisation phase to be performed which is limited to exactly what is necessary to achieve optimum magnetisation of the rotor.

In a second embodiment, the electrical value is a voltage which is applied to the said winding.

The means of initiating the generation of the rotating magnetic field are for example then capable of initiating the said generation after a period of application of the said voltage which is determined as a function of the electrical value which is measured, which likewise enables the period to be adapted to allow optimum pre-magnetisation to be achieved.

In an embodiment of the invention, the rotating electrical machine is arranged to be incorporated in a variable voltage system whose voltage is able to vary between two limiting values, such for example as between 14 V and 28 V or 12 V and 25 V.

This system may, if necessary, be arranged to be able to store the electrical energy produced by the braking of a vehicle, in particular with the help of one or more supercapacitors.

The invention is particularly well adapted to this type of system because it enables the pre-magnetisation time to be optimised as a function of the voltage, which is variable. Particularly when the voltage of the vehicle's electrical system is high, the time for the pre-magnetisation may be shortened in comparison with the case where the voltage is low.

The invention also proposes a method of controlling a rotating electrical machine which comprises a first member capable of generating a magnetic field which rotates relative to the said first member, and a second member which is provided with a winding through which a current can flow, such that the rotating magnetic field drives the second member in rotation, which method is characterised by the following steps:

measurement of an electrical value which is at least related to the said current, generation of a rotating magnetic field as from a time which is determined as a function of the electrical value which is measured.

The optional features of the electrical machine which have been presented above may possibly be applied in the same way to this method.

BRIEF DESCRIPTION OF THE DRAWINGS

Other features and advantages of the invention will be better apparent from the following description, which is given by reference to the accompanying drawings in which.

DETAILED DESCRIPTION

Figure 1:
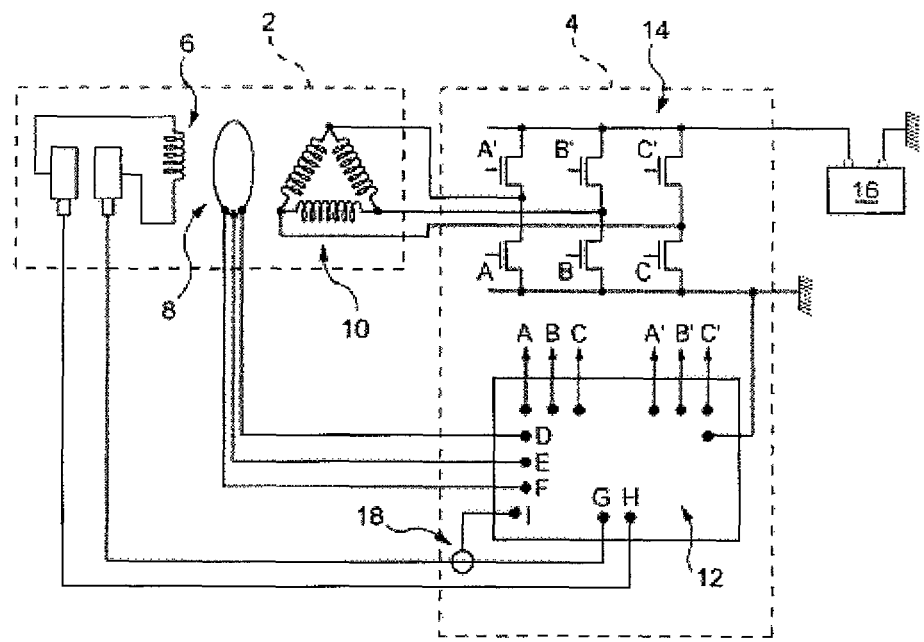
FIG. 1 is a circuit diagram of a three-phase rotating electrical machine conforming to the teaching of the invention.

The rotating electrical machine which is shown in FIG. 1 comprises, in essence, a mechanical assembly 2 which is formed in particular by a rotor and a stator, and an electronic module 4 which comprises a power circuit 14 and a control circuit 12.

The electronic module 4 is supplied, directly in the present case, by the battery 16 of the vehicle in which the rotating electrical machine is fitted.

In a variant to which the application of the invention is particularly beneficial, the electronic module 4 could be connected to the battery 16 via a circuit for storing electrical energy, which circuit is formed for example by a supercapacitor and a d.c./d.c. converter.

What happens in this case is that the electronic module 4 is supplied by the supercapacitor which in turn is connected to the battery via the d.c./d.c. converter (the latter enabling operation to take place correctly even though there is a voltage which can vary, between 12 V and 25 V for example, at the supercapacitor for storing electrical energy, and a voltage which is relatively stable, at about 12 V, from the battery).

From the electrical point of view, the rotor of the mechanical assembly 2 carries a winding 6, whereas the stator which is associated with it carries three windings 10 which are capable of generating a rotating magnetic field by virtue of the successive injection into the different windings 10 of a current by means of controlled switches in the power circuit 14.

A position sensor 8 is also provided to indicate the position of the rotor to the control circuit 12 (connections D, E, F) to enable the controlled switches to be exactly controlled by the latter (by means of signals A, B, C and A', B', C').

The rotor (which carries the winding 6) is also coupled to the heat engine of the vehicle and the rotating electrical machine thus performs at least a function as a starter when the control circuit 12 causes the appropriate controlled switches in the power circuit 14 to open and close in such a way as to inject current from the battery 16 into the different windings 10 of the stator in order to drive the rotor, and hence the engine, in rotation.

The rotating electrical machine may also (though not necessarily) perform a function as an alternator, in which case, when the engine is turning, the rotation of the rotor within the stator causes current intended for the battery 16 to be generated through the power circuit 14, the battery 16 being charged because of this. The rotating machine is then said to be reversible.

The electronic module 4 also comprises a circuit 18 for measuring the current in the winding 6 of the rotor. As can be seen from FIG. 1, the winding 6 is connected to two terminals G, H of the control circuit 12 by means of cables one of which carries the circuit 18 for measuring the current, the information which is measured being received by the control circuit 12 at a terminal I.

Figure 2:
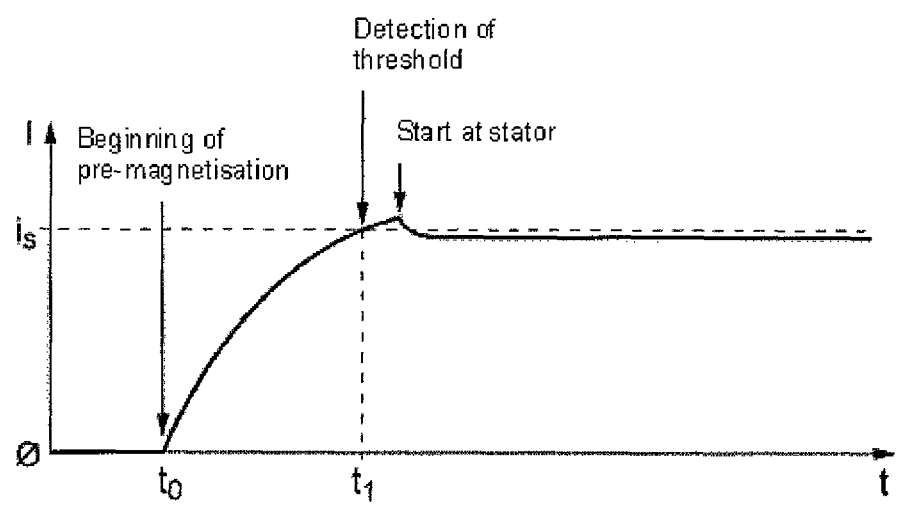
FIG. 2 shows the variation of the current in the winding of the rotor of the machine shown in FIG. 1.

Referring to FIG. 2, a start-up phase by the rotating electrical machine when in the starter mode will now be described.

When it is determined that a start-up of the engine (and consequently a putting into operation of the electrical machine) needs to take place, such for example as in the way indicated by the teaching of document FR 2 875 556 (or by any other suitable method), the control circuit 12 begins the pre-magnetisation phase by applying a voltage (the voltage from the battery for example) to the terminals G, H which are connected to the winding 6 of the rotor (at $t_0$ in FIG. 2).

In the variant which is envisaged above, the voltage which is applied to the terminals of the winding 6 could for example be the voltage at the terminals of the supercapacitor, which thus varies over a wide range. In the case which is shown in FIG. 1, the voltage which is applied to the winding 6 may also, likewise, be variable as a function for example of the load on the battery 16 or of other parameters which may affect the voltage, such for example as the state to which the various components have aged and the outside temperature.

If there is no load, the application of a voltage to the terminals G, H of the winding 6 results in a swift rise in the current in the winding 6.

By means of the measuring circuit 18, the control circuit 12 monitors the value of the current flowing through the winding 6 until this value reaches a predetermined threshold $i_s$ (such for example as a value of 20 A).

When a current of the value $i_s$ is detected in the winding 6 by means of the measuring circuit 18 (at time $t_1$ in FIG. 2, the period $t_1-t_0$ being variable as a function of the voltage used), the control circuit 12 causes the control signals A, B, C, A', B', C' intended for the controlled switches in the power circuit 14 to be started in order to initiate (i.e. begin) the generation of a rotating field by means of the windings 10 of the stator.

Hence, the pre-magnetisation phase enables precisely that value of current which has been determined to be optimum (the current termed "saturation" from which there is no further increase in the electromotive force in the rotating machine) to be reached, whatever the external conditions, in particular of current, affecting the electronic circuit.

The above example is only one possible manner of embodying the invention and the invention is not limited to it.

It is in particular possible for the measurement of the current in the winding 6 to be replaced by a measurement of the voltage which is applied to this winding, in which case the duration of the pre-magnetisation phase is for example determined by the control circuit 12, as a function of the voltage which is measured, from for example a look-up table which has been determined, where necessary, from previous tests.

The invention claimed is:

1. A rotating electrical machine comprising:
a first member (10) provided for generating a magnetic field rotating relative to the first member;
a second member provided with a winding (6) through which a current can flow, such that the rotating magnetic field drives the second member in rotation;
means for measuring (18) an electrical value at least related to the current flowing through the winding of the second member; and
means (12) for initiating the generation of the rotating magnetic field as from a time determined as a function of the electrical value which is measured, the electrical value being the current;
the means for initiating the generation of the rotating magnetic field capable of initiating the generation when the current measured reaches a threshold value $i_s$.

2. The electrical machine according to claim 1, wherein the electrical machine is arranged to be incorporated in a variable voltage system whose voltage is able to vary between two limiting values.

3. A rotating electrical machine, comprising:
a first member (10) provided for generating a magnetic field rotating relative to the first member;
a second member provided with a winding (6) through which a current can flow, such that the rotating magnetic field drives the second member in rotation;
means for measuring (18) an electrical value at least related to the current flowing through the winding of the second member; and
means (12) for initiating the generation of the rotating magnetic field as from a time determined as a function of the electrical value which is measured , the electrical value being a voltage applied to the winding;
the means for initiating the generation of the rotating magnetic field being capable of initiating the generation after a period of application of the voltage determined as a function of the electrical value which is measured.

4. A method of controlling a rotating electrical machine comprising a first member (10) provided for generating a magnetic field rotating relative to the first member and a second member provided with a winding (6) through which a current can flow such that the rotating magnetic field drives the second member in rotation, the method comprising the following steps:
measuring an electrical value which is at least related to the current flowing through the winding of the second member; and generating a rotating magnetic field as from a time determined as a function of the electrical value which is measured, the electrical value being the current;

the step of generating the rotating magnetic field being initiated when the measured current reaches a threshold value $i_s$.

5. A method for controlling a rotating electrical machine comprising a first member (10) provided for generating a magnetic field rotating relative to the first member and a second member provided with a winding (6) through which a current can flow such that the rotating magnetic field drives the second member in rotation, the method comprising the steps of:

measuring an electrical value which is at least related to the current flowing through the winding of the second member; and generating a rotating magnetic field as from a time determined as a function of the electrical value which is measured, the electrical value being a voltage applied to the winding;

the step of generating the rotating magnetic field being initiated after a period of application of the voltage determined as a function of the voltage applied to the winding.

6. A rotating electrical machine comprising:

a first member (10) provided for generating a magnetic field rotating relative to the first member;

a second member provided with a winding (6) such that the rotating magnetic field of the first member rotatably driving the second member;

a measuring circuit (18) for measuring an electrical value at least related to a current flowing through the winding of the second member; and a control circuit (12) for initiating the generation of the rotating magnetic field at a time determined as a function of the electrical value measured by the measuring circuit (18);

the control circuit (12) for initiating the generation of the rotating magnetic field being capable of initiating the generation when the current measured reaches a threshold value $i_s$.

* * * * *